(12) United States Patent
Tomlin

(10) Patent No.: US 11,773,940 B2
(45) Date of Patent: Oct. 3, 2023

(54) ADVANCED HYDRAULIC DAMPER SPOOL VALVE

(71) Applicant: Multimatic Inc., Markham (CA)

(72) Inventor: Andrew Tomlin, Suffolk (GB)

(73) Assignee: MULTIMATIC INC., Markham (CA)

( * ) Notice: Subject to any disclaimer, the term of this patent is extended or adjusted under 35 U.S.C. 154(b) by 0 days.

(21) Appl. No.: 17/800,724

(22) PCT Filed: Mar. 3, 2021

(86) PCT No.: PCT/US2021/020646
§ 371 (c)(1),
(2) Date: Aug. 18, 2022

(87) PCT Pub. No.: WO2021/178519
PCT Pub. Date: Sep. 10, 2021

(65) Prior Publication Data
US 2023/0092250 A1    Mar. 23, 2023

Related U.S. Application Data

(60) Provisional application No. 62/985,101, filed on Mar. 4, 2020.

(51) Int. Cl.
*F16F 9/34* (2006.01)
*F16F 9/512* (2006.01)

(52) U.S. Cl.
CPC .......... *F16F 9/3405* (2013.01); *F16F 9/5126* (2013.01)

(58) Field of Classification Search
CPC ........ F16F 9/5126; F16F 9/512; F16F 9/3214; F16F 9/3405; F16F 9/516; F16F 9/34;
(Continued)

(56) References Cited

U.S. PATENT DOCUMENTS 5,386,892 A    2/1995  Ashiba
7,066,310 B2*  6/2006  Mintgen ............... E05C 17/305
                                                188/322.22
(Continued)

FOREIGN PATENT DOCUMENTS

EP    3212958 A1    9/2017
EP    3212958 B1    9/2019
(Continued)

OTHER PUBLICATIONS

International Search Report and Written Opinion for International Application No. PCT/US2021/020646 dated Jul. 7, 2021.

*Primary Examiner* — Robert A. Siconolfi
*Assistant Examiner* — Mahbubur Rashid
(74) *Attorney, Agent, or Firm* — Carlson, Gaskey & Olds, P.C.

(57) ABSTRACT

A hydraulic damper spool valve (15) includes a pair of resilient energy storage members (47, 49) one of which is disposed between each of a valve spool (39, 41) and a valve body dividing section (27) so as to bias the valve spools (39, 41) in opposing directions to the forces generated by the operating pressures in the hydraulic fluid of the hydraulic damper (1). The valve spools (39, 41) are configured to vary the hydraulic flow restriction between the upper portion (11) and the lower portion (13) of the hydraulic damper (1). A compression hydraulic flow path is structurally separate from a rebound hydraulic flow path to prevent backflow via the other hydraulic flow path during hydraulic flow in either direction, each said flow path communicating with only the at least one shaped aperture (35, 37) adjacent the opposing end of one of the valve sleeves (23, 25).

10 Claims, 5 Drawing Sheets

(58) Field of Classification Search
CPC .......... F16F 9/466; F16F 9/3481; F16F 9/346;
F16F 9/3488; F16F 9/342; F16F 9/537;
F16F 9/469; B60G 2500/11; B60G
2500/114; B60G 2400/50; B60G
2400/518; B60G 2400/5182
See application file for complete search history.

(56) References Cited

U.S. PATENT DOCUMENTS

| | | | |
|---|---|---|---|
| 8,800,732 B2* | 8/2014 | Holt | F16F 9/5126 |
| | | | 188/313 |
| 9,080,634 B2* | 7/2015 | Nowaczyk | F16F 9/182 |
| 2012/0217106 A1* | 8/2012 | O'Flynn | F16F 9/5126 |
| | | | 188/322.13 |
| 2017/0234396 A1 | 8/2017 | Hamers et al. | |

FOREIGN PATENT DOCUMENTS

| | | |
|---|---|---|
| WO | 2014143944 A1 | 9/2014 |
| WO | 2016066314 A1 | 5/2016 |

* cited by examiner

ADVANCED HYDRAULIC DAMPER SPOOL VALVE

CROSS-REFERENCE TO RELATED APPLICATIONS

This application claims priority to U.S. Provisional Application No. 62/985,101 which was filed on Mar. 4, 2020, and is incorporated herein by reference.

BACKGROUND OF THE INVENTION

This invention relates to a valve for a hydraulic damper including a hydraulic damper for use in wheeled vehicle suspension.

Hydraulic dampers used to control dynamic suspension systems generally include a piston which is slideably carried within a cylindrical main body and peripherally sealed to its walls. The piston is attached to a shaft assembly. The piston divides the cylindrical main body into two portions (an upper portion and a lower portion) that are connected by restrictive passages which retard the rate of fluid flow between the upper portion and the lower portion when the shaft assembly moves relative to the main body. In this manner, the damper's core operating characteristic, defined by the relationship between pressure and flow, is dictated by the geometric configuration of restrictive passages between the upper portion and the lower portion.

If the restrictive passages are simply configured as fixed orifices, then the pressure generated across the damper piston increases as the square of the hydraulic flow through the orifices. Unfortunately, this squared law pressure-flow relationship is not a desirable characteristic for controlling the majority of dynamic systems. In the case of an automotive suspension system, the damper is normally referred to as a shock absorber and the pressure-flow characteristic is directly proportional to the shock absorber's defining force-velocity relationship which is generally required to be linear or even somewhat digressive. The preferred method to achieve desired damper characteristics that differ from the basic fixed orifice square law is to vary the area of the orifice in a predetermined relationship to the pressure across the piston.

The most common variable orifice damper valve arrangement consists of a stack of compliant plates fixed over an array of passages that connect the upper portion and the lower portion either through or around the piston. The pressure across the piston imparts a load on the plates causing them to deflect which in turn uncovers the passages and creates a path for the damper's hydraulic fluid. The magnitude of the deflection of the plates varies in proportion to the pressure across the piston and so creates a form of a variable orifice. U.S. pat. No. 2,748,898 to DeCarbon is the earliest reference to such an arrangement and describes a double acting shock absorber in which the piston is configured with an arrangement of passages that are sealed by resilient leaf elements that are stressed and resiliently bent by fluid issuing under pressure from the passages. The '898 patent also details a unique, but now widely used method of arranging the passages of two sets of leaf elements above and below the piston to facilitate independent and possibly asymmetric pressure-flow characteristics in the two different operating directions.

The most significant limitation of using compliant plates to create a variable orifice damper valve is that the pressure-flow characteristic is highly dependent on the deformed shape of the compliant plates which in turn is extremely sensitive to plate thickness, plate material properties, dimensional tolerance of the plate shape, assembly process, friction between the plates in a stack, locational tolerance of the passages relative to the plates, dimensional tolerance of the passage cross sections and cleanliness of the assembly. These sensitivities ultimately present a significant challenge to achieving a desired pressure flow characteristic or when trying to match the characteristic of two dampers. An additional disadvantage of the compliant plate arrangement is that the pressure-flow characteristic cannot easily be predicted using mathematical techniques owing to its complex operating mechanism. Another shortcoming of this configuration is that the pressure-flow characteristic tends to diverge from its original curve over time owing to the compliant plate material becoming fatigued and losing its stiffness and strength, as well as small particles created from seal, piston and shaft wear becoming trapped between the plates.

U.S. pat. No. 5,547,050 to Beck illustrates the complexity associated with manufacturing and assembling a damper that uses compliant plates to create a variable orifice. The '050 patent describes a method of attaching the plates and piston to a shaft to overcome some of the dimensional limitations associated with such an arrangement. Although the modified arrangement eliminates the tolerances related to the compliant plate attachment, it does not improve the variation associated with the dimensional accuracy of the plates themselves or the divergence from the original pressure-flow characteristic that occurs over time. Moreover, the '050 patent does not describe an arrangement for which the damper's operating characteristic can be mathematically predicted.

U.S. 5,709,290 to Ekert et al. describes providing compression and rebound stop surfaces which uniformly support the compliant plates in their deflected state at both limits of deflection travel. The compliant plates of the '290 patent are prevented from yielding to a deformed condition which can significantly alter the designed-in performance characteristics of the damper assembly. The stop surface arrangement considerably improves the damper's ability to maintain its original pressure-flow characteristic over time. This system, however, is particularly sensitive to detailed tolerances such that minor variations in specific design features may result in significant, undesirable changes in performance characteristics.

The limitations of variable orifice damper valves which use compliant plate stacks have been recognized. Although numerous alternatives have been suggested, and appear in the prior art, this arrangement remains the dominant approach to providing the desired pressure-flow characteristics in shock absorbers as used in automotive suspension systems.

U.S. Pat. No. 6,311,812 to Sonsterad et al. offers an alternative to the compliant plate approach by describing a poppet style pressure regulator that uses pressure balancing across the poppet to control the area of the resulting annular orifice. The shape of the front side of the poppet can be varied to control the pressure balancing. In this manner, the overall pressure-flow characteristic of the pressure regulator and ultimately of a damper that uses the device is controlled by the varying area of the annular orifice. Although the '812 patent overcomes many of the tolerance sensitivity problems associated with compliant plate variable orifice damper valves, its basic configuration is limited by offering only an annular orifice hydraulic restriction. This limitation is overcome in alternative embodiments of the disclosure but only through the addition of significant complexity which once again introduces additional sensitivity to manufacturing tolerance. The most significant limitation of the valve arrangement of the '812 patent, however, is that the valve arrangement is unidirectional. For the pressure regulator of the '812 patent to be used in a double acting shock absorber, an array of one-way ball valves is employed to act in both compression and rebound directions. This limits the pressure-flow characteristic of the damper to be identical in both the compression and rebound directions which is rarely desirable. Additionally, the pressure regulator of the '812 patent is large and complex, and cannot reasonably be integrated into a damper piston. Finally, similar to the compliant plate configurations, the '812 patent does not describe an arrangement for which the pressure-flow characteristic can be mathematically predicted.

An effective but complex solution to the tolerance sensitivity problems that exist in passive variable orifice valves is described in U.S. Pat. No. 5,996,745 to Jones et al. The '745 patent describes a damper valve for controlling the pressure-flow, and therefore the force-velocity, characteristic of a shock absorber that consists of a bender with a piezoelectric material embedded within it. The bender is used in a similar manner to the compliant plates of a conventional damper valve, but by supplying a voltage across the piezoelectric material, the stiffness of the bender is changed and the pressure required to deform the bender is modified. An electronic sensor is used to measure the velocity of the piston and the voltage supplied to the bender is varied in relationship to the measured velocity. In this manner, the stiffness of the bender is made dependent on the velocity of the damper and the force-velocity, and therefore pressure-flow, characteristics are actively controlled using a feedback system. Although the piezoelectric material based variable orifice valve of the '745 patent can overcome the tolerance limitations of passive damper valves, the associated complexity and cost is prohibitive. Additionally, the '745 patent does not describe an arrangement for which the pressure-flow characteristic can be simply mathematically predicted.

Accordingly, the applicant set out to develop a damper valve that eliminates the complexity associated with the previously described styles of variable orifice arrangements yet offers a simple configuration that provides a mathematically predictable, repeatable and robust pressure-flow characteristic. The goal was to provide a spool valve for a hydraulic damper that reduces the number of required components, simplifies the assembly procedure, lowers the manufacturing cost and improves the overall performance of the damper. A spool valve was configured to control the flow of hydraulic fluid across the main piston of the damper in a predetermined relationship to the pressure differential across the main piston via a variable orifice arrangement based on proportionally blocked shaped apertures. The shaped apertures were configured to provide a single path for the hydraulic fluid between an upper portion and a lower portion of the damper main body and were adapted to be proportionally opened and closed in response to the pressure differential across the main piston. In this manner, the damper's operating characteristic was simply and predictably dictated by the geometric configuration of the shaped apertures. The precisely defined open area of the shaped apertures provides a mathematically predictable hydraulic flow restriction that operates predominantly in a turbulent regime resulting in insensitivity to hydraulic fluid viscosity and consequently temperature change.

U.S. Pat. No. 8,235,186 to Holt et al. describes such a hydraulic damper assembly including a main body, a main piston and a valve body. The valve body comprises a single valve spool provided with at least one shaped aperture, a valve sleeve adapted to close the shaped aperture to hydraulic fluid flow between compression and rebound strokes, and to allow such hydraulic fluid flow in opposite directions during compression and rebound strokes respectively by opening the shaped aperture to varying degrees. There is a single flow passage joining the upper and lower portions of the damper. A single resilient storage member, typically a coil spring, biases the valve spool and valve sleeve against each other. Alternatively, two energy storage bodies may be used to separately bias the valve spool and the valve sleeve against the valve body. In the compression stroke, hydraulic pressure on an end of the valve sleeve compresses the coil spring while the valve spool remains stationary, and allows hydraulic fluid to flow in only one direction. As the hydraulic pressure decreases, the coil spring urges the valve sleeve back to its resting position with the shaped aperture closed. Then, in the rebound stroke, hydraulic pressure in the opposite direction urges the valve spool to compress the coil spring while the valve spool remains stationary. This again opens the shaped aperture and allows hydraulic fluid to flow in the opposite direction. The use of a single shaped aperture, or set of such apertures, in the valve spool is effective but does not permit tuning of the hydraulic flow using only the shaped aperture or apertures to create differences between the compression flow and the rebound flow.

U.S. Pat. No. 8,800,732 to Holt et al. describes an improved hydraulic damper assembly including a main body, a main piston and a valve body. The valve body comprises two valve spools and a single valve sleeve provided with separate compression flow and rebound flow apertures. A single resilient energy storage means, again typically a coil spring, biases the valve spools against each other such that hydraulic fluid pressure on one of the valve spools opens a rebound flow aperture while pressure on the other valve spool opens a compression flow aperture. All flow apertures are closed in the absence of differential pressures in the hydraulic fluid. Again, a single flow passage is employed. One-way check shims are used to prevent back flow of hydraulic fluid in the unwanted direction when a pressure differential exists. This improved damper allows the ability to tune the hydraulic flow between compression and rebound strokes. One down side of the damper is that the one-way check shims, being subject to stress via a very large number of flexing cycles, could wear or potentially break. Although likely not fatal to operation of the dampers, such wear or breakage could eventually reduce damper performance These innovations provided a highly successful generation of hydraulic dampers. Nonetheless, a damper which permitted tuning of hydraulic flow between compression and rebound piston strokes while avoiding wear through continuous use was desirable.

SUMMARY OF THE INVENTION

A further improved hydraulic damper assembly provides the advantages of the '186 and '732 patents with fewer moving parts and enhanced functionality. This is accomplished, in part, by elimination of one-way valves through use of structurally separate hydraulic flow paths.

In a first principal embodiment of the invention, a hydraulic damper spool valve for a hydraulic damper comprises a valve body affixed to a main piston rod of the hydraulic damper, the valve body configured with openings adjacent its opposing ends, one of which openings is in fluid communication with an upper portion of the hydraulic damper and the other one of which openings is in fluid communication with a lower portion of the hydraulic damper to facilitate flow of a hydraulic fluid between the upper portion and the lower portion under operating pressures, a pair of hollow cylindrical valve sleeves defining a bore interrupted by a dividing section or valve body membrane and being fixed in relation to the valve body, the hollow cylindrical valve sleeves each configured with at least one shaped aperture adjacent an opposing end of the respective valve sleeve selectively adapted to connect hydraulically the upper portion and the lower portion of the hydraulic damper, a pair of valve spools each operatively configured to be moveably disposed within the bore of the respective valve sleeve and adapted to selectively block, at any one time, all the shaped apertures, or only the at least one shaped aperture adjacent the opposing end of one valve sleeve, or only the at least one shaped aperture adjacent the opposing end of the other valve sleeve, a pair of resilient energy storage members one of which is disposed between each valve spool and the valve body dividing section or membrane so as to bias the valve spools in opposing directions to the forces generated by the operating pressures in the hydraulic fluid of the hydraulic damper, such that when a respective energy storage member is compressed as operating pressure is induced at either of the valve body openings, either one or the other of the valve spools moves relative to the respective valve sleeve so that an open area of the at least one shaped aperture adjacent the moving valve spool varies in proportional relationship to the pressure, thereby varying the hydraulic flow restriction between the upper portion and the lower portion of the hydraulic damper, while the non-moving valve spool blocks the at least one shaped aperture adjacent the non-moving valve spool, and a compression hydraulic flow path is structurally separate from a rebound hydraulic flow path to prevent backflow via the other hydraulic flow path during hydraulic flow in either direction, each said flow path communicating with only the at least one shaped aperture adjacent the opposing end of one of the valve sleeves.

In a further aspect of the invention, the hollow cylindrical valve sleeves comprise a compression valve sleeve configured with an array of compression flow shaped apertures, and a rebound valve sleeve configured with an array of rebound flow shaped apertures, the energy storage members comprise a compression energy storage member and a rebound energy storage member, and the pair of valve spools comprises a compression valve spool configured to selectively open and close the corresponding compression flow shaped apertures and a rebound valve spool configured to selectively open and close the corresponding rebound flow shaped apertures.

In a further aspect of the invention, the arrays of rebound and compression flow shaped apertures are configured with predetermined precise shapes and each of the rebound and compression valve spools is configured with a leading edge that is adapted to accurately control the variable open area of the respective rebound and compression flow apertures in a proportional relationship to the operating pressure in the damper so as to provide the desired pressure-flow characteristics.

In a further aspect of the invention, the resilient energy storage members are coil springs.

In a further aspect of the invention, the bores of the hollow cylindrical valve sleeves are adapted to receive the valve spools with a predetermined close tolerance radial clearance that is configured to selectively allow longitudinal movement of each of the valve spools within the respective bore while preventing hydraulic flow through the radial clearance.

In a further aspect of the invention, the hydraulic damper spool valve is affixed to the main piston through mechanical fastening, welding, threading or the like.

In a further aspect of the invention, a leading edge of each valve spool exposed to hydraulic fluid flow via the at least one corresponding shaped aperture is chamfered to present a sharp edge to provide minimal perturbation of hydraulic fluid flow across the valve spool.

In a further aspect of the invention, the valve sleeves comprise a compression valve sleeve and a rebound valve sleeve separated by a dividing section of the valve body, and the resilient energy storage members comprise a compression energy storage member and a rebound energy storage member which respectively bias one of the pair of valve spools against the dividing section of the valve body.

In a second principal embodiment of the invention, a hydraulic damper assembly comprises a main body, a shaft assembly and a main piston comprising a valve body affixed to a piston rod operatively configured to define an upper portion and a lower portion within the main body, the valve body configured with openings at its opposing ends, one of which is selectively in fluid communication with an upper portion of the main body and the other of which is selectively in fluid communication with a lower portion of the main body, a compression hydraulic flow path structurally separate from a rebound hydraulic flow path to prevent back flow during hydraulic flow in either direction via the other hydraulic flow path, a pair of hollow cylindrical valve sleeves defining a bore interrupted by a valve body membrane and being fixed in relation to the valve body, the hollow cylindrical valve sleeves each configured with at least one shaped aperture adjacent an opposing end of the respective valve sleeve selectively adapted to hydraulically connect the upper portion and the lower portion of the hydraulic damper, a pair of valve spools each operatively configured to be moveably disposed within the bore of the respective valve sleeve and adapted to selectively block, at any one time, all shaped apertures, or only the at least one shaped aperture adjacent a first end of the valve sleeve, or only the at least one shaped aperture adjacent a second end of the valve sleeve, a resilient energy storage member disposed between the valve spools so as to bias the valve spools in opposing directions to the forces generated by the operating pressures in the hydraulic fluid of the hydraulic damper, such that when the energy storage member is compressed as operating pressure is induced at either of the valve body openings, either one or the other of the valve spools moves relative to the valve sleeve so that an open area of the at least one shaped aperture adjacent the moving valve spool varies in proportional relationship to the pressure, thereby varying the hydraulic flow restriction between the upper portion and the lower portion of the hydraulic damper, while the non-moving valve spool blocks the at least one shaped aperture adjacent the non-moving valve spool.

In a further aspect of the second principal embodiment of the invention, the valve sleeves comprise a compression valve sleeve and a rebound valve sleeve separated by a dividing section of the valve body, and the resilient energy storage members comprise a compression energy storage member and a rebound energy storage member which respectively bias one of the pair of valve spools against the dividing section of the valve body.

In a further aspect of the second principal embodiment of the invention, the hydraulic damper main body comprises a cylindrical internal bore wall, and the hydraulic damper spool valve is configured to slideably contact the main body internal bore wall with a close tolerance to allow longitudinal movement of the spool valve within the main body internal cylindrical bore wall while preventing hydraulic flow there between.

In a further aspect of the second principal embodiment of the invention, the hydraulic spool valve is configured with a resilient seal between the valve body and the main body internal cylindrical bore.

BRIEF DESCRIPTION OF THE DRAWINGS

A preferred embodiment of the invention is shown in the attached drawings in which.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
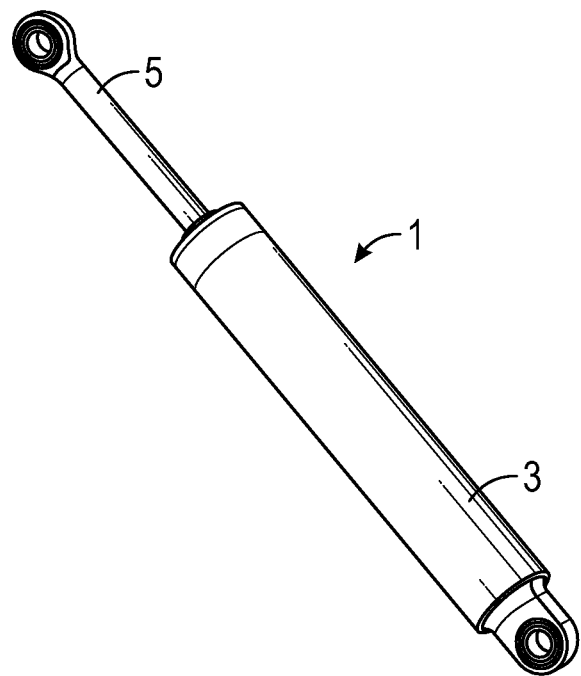
FIG. 1 is a perspective view of a hydraulic damper assembly.
Figure 2:
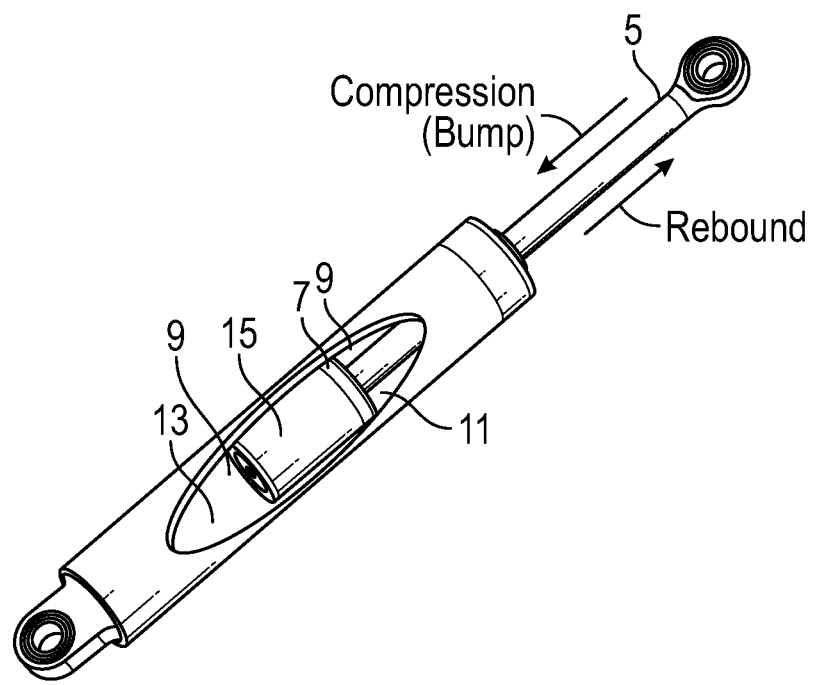
FIG. 2 is a partial cut-away view of the hydraulic damper assembly of FIG. 1.
Figure 3:
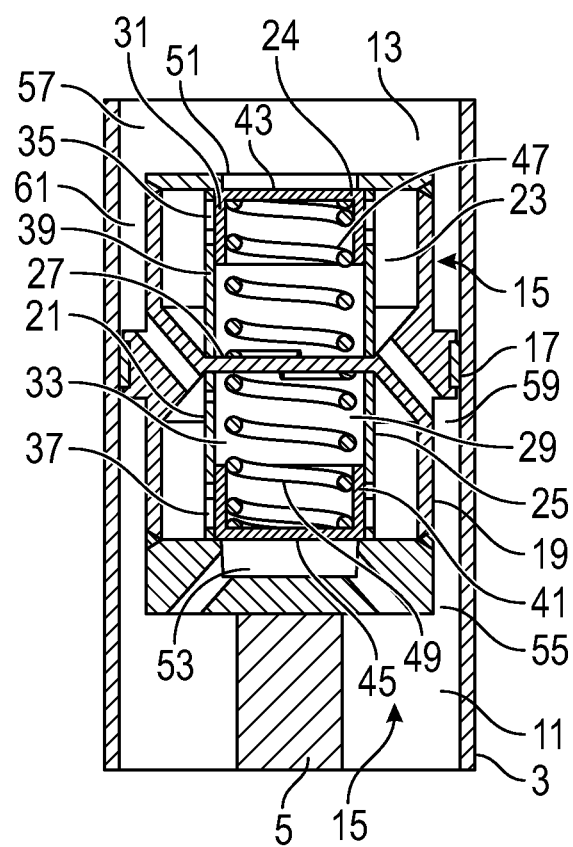
FIG. 3 is a cross-sectional elevation view of a portion of the hydraulic damper assembly with no hydraulic fluid flow.
Figure 8:
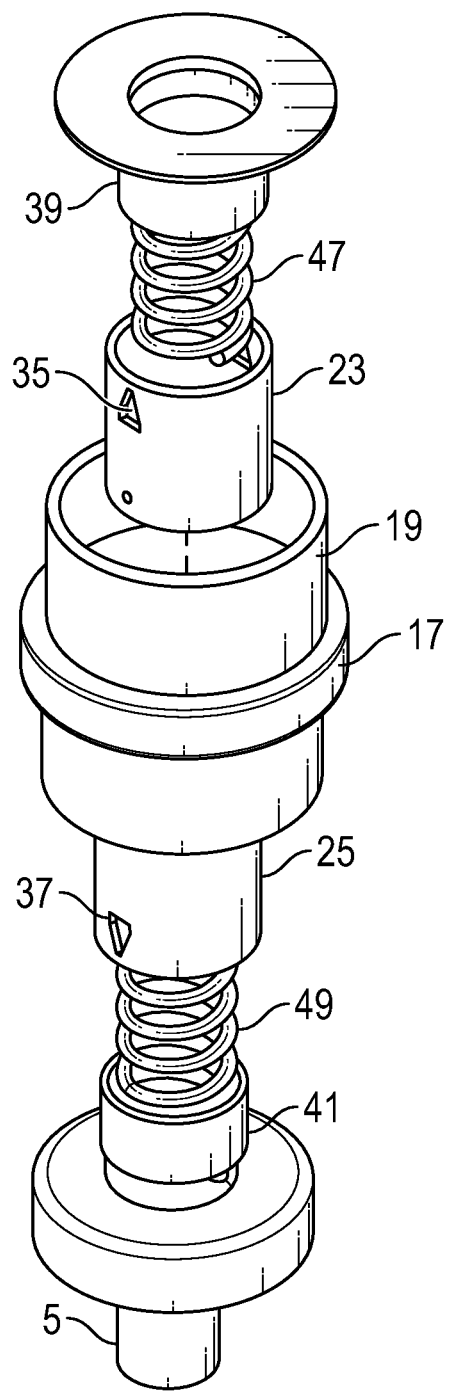
FIG. 8 is a perspective, explosion view of a hydraulic damper spool valve.

Referring to FIG. 1 and FIG. 2, a hydraulic damper assembly (1) consists of a main body (3), a shaft assembly (5) and a main piston (7) that is configured to divide the internal chamber (9) of the main body (3) into an upper portion (11) and a lower portion (13). The upper portion (11) and the lower portion (13) of the main body (3) contain hydraulic fluid. The terms upper and lower are used here to define relative positions and not to indicate a particular spatial orientation of the damper assembly. The main piston (7) comprises a hydraulic damper spool valve (15) which is mounted to the shaft assembly (5). The hydraulic damper spool valve (15) may be affixed to the shaft assembly (5) using a mechanical fastener, welding, a threaded connection, or the like. As shown in FIG. 3 and FIG. 8, one or more seals (17) may be disposed between the hydraulic damper spool valve (15) and the main body (3).

The hydraulic damper spool valve (15) comprises a valve body (19).

The hydraulic damper spool valve (15) also comprises a pair of hollow cylindrical valve sleeves (23, 25) securely mounted centrally within the valve body (19). These comprise a compression valve sleeve (23) and a rebound valve sleeve (25). The valve sleeves (23, 25) are mounted securely within the valve body (19) and are seated to the valve body (19) at the opposing ends of the valve sleeves (23, 25) and centrally at a dividing section or membrane (27) of the valve body (19) to prevent hydraulic flow at those ends. The valve sleeves (23, 25) define an internal cylindrical bore (29) interrupted by the valve body dividing section or membrane (27). The bore (29) comprises two bores (31, 33) separated by the valve body dividing section or membrane (27). Alternatively, the dividing section or membrane (27) may comprise a separate component rather than a part of the valve body itself.

The valve sleeves (23, 25) are configured with an array of shaped flow apertures (35, 37). These comprise compression flow shaped apertures (35) adjacent an end of one valve sleeve (23) and rebound flow shaped apertures (37) adjacent the opposite or opposing end of the other valve sleeve (25).

The valve sleeve internal cylindrical bores (31, 33) are adapted to receive a pair of valve spools (39, 41). A compression valve spool (39) is located adjacent the compression flow shaped apertures (35). A rebound valve spool (41) is located adjacent the rebound flow shaped apertures (37). The leading edges (43, 45) of the valve spools (39, 41) may be chamfered to create sharp edges. This reduces perturbation of hydraulic fluid flow across such edges and thus facilitates smoother operation of the hydraulic damper.

A pair of resilient energy storage means (47, 49) is provided, one of which is arranged between each of the valve spools (39, 41) and the valve body dividing section or membrane (27). Typically, these resilient energy storage means are coil springs which bias the valve spools (39, 41) in opposite directions. The valve spools (39, 41) may seat against the valve body (19) when at rest and are preferably biased by the coil springs (47, 49) at all times. A compression coil spring (47) is associated with the compression valve spool (39) and a rebound coil spring (49) is associated with the rebound valve spool (41).

The valve body (19) is provided with multiple openings at each end. A first set of openings (51, 53) lead respectively from the lower portion (13) and the upper portion (11) of the damper to the internal bores (31, 33) of the valve sleeves (23, 25). These comprise a compression flow first opening (51) and a rebound flow first opening (53). A second set of openings, a compression flow second opening (55) and a rebound flow second opening (57) lie outside the valve sleeves (23, 25) and communicate with separate flow paths (59, 61) which connect the upper portion (11) to the lower portion (13). One of these second flow paths, the compression flow path (59), is in communication with the compression flow shaped apertures (35) and the other second flow path, the rebound flow path (61), is in communication with the rebound flow shaped apertures (37).

When there is no directional operating pressure in the damper, as illustrated in FIG. 3, the resilient energy storage means (47, 49) bias the compression and rebound valve spools (39, 41) in opposing directions to completely block the respective arrays of compression and rebound flow shaped apertures (35, 37) to block the hydraulic paths between the upper portion (11) and the lower portion (13) of the hydraulic damper. Until a compression or rebound flow shaped aperture is exposed to hydraulic pressure, no hydraulic fluid may flow.

Figure 4:
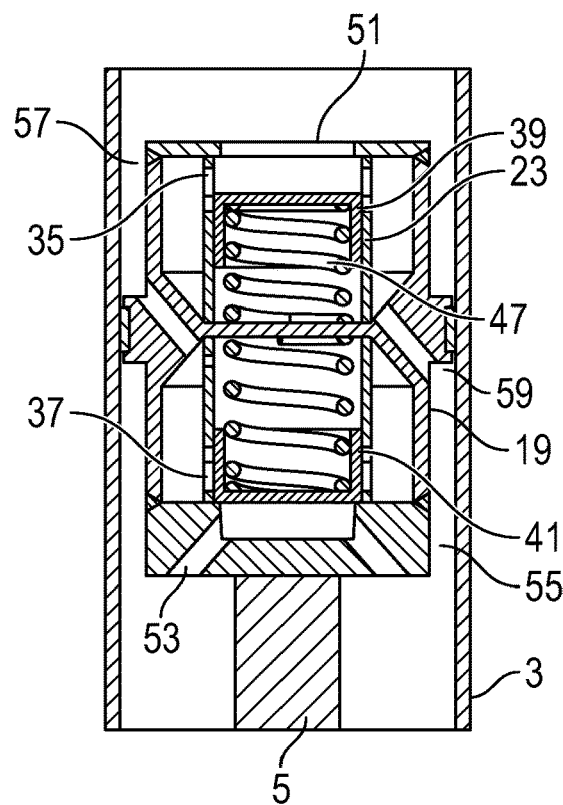
FIG. 4 is a cross-sectional elevation view of a portion of the hydraulic damper assembly during a compression or bump stroke.
Figure 5:
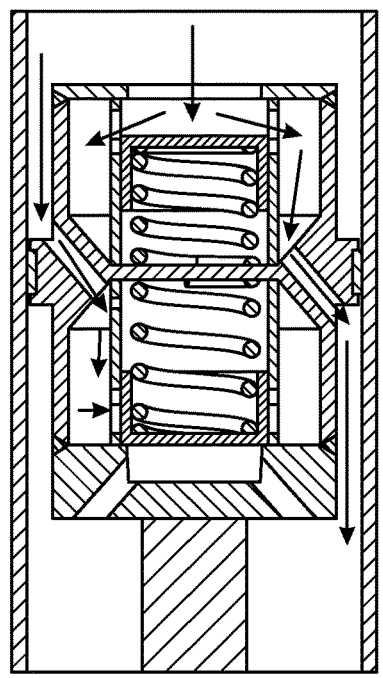
FIG. 5 is the view of FIG. 4 showing flow of hydraulic fluid during a compression or bump stroke.

In general terms, when the hydraulic damper is at rest there is no induced pressure differential between the upper portion (11) and the lower portion (13). When a compression (or bump) stroke of the damper occurs, as illustrated in FIG. 4 and FIG. 5, hydraulic fluid seeks to flow from the lower portion (13) (distant from the piston rod) to the upper portion (11) (containing the piston rod). Hydraulic fluid thus exerts pressure on the compression valve spool (39) which compresses the compression coil spring (47). This causes movement of the compression valve spool (39) in relation to the compression valve sleeve (23) which progressively exposes the one or more compression flow shaped apertures (35) in the compression valve sleeve (23). Hydraulic fluid then flows from the lower portion (13) through the exposed compression flow shaped aperture or apertures (35) in the compression valve sleeve (23), through the compression flow path (59), through compression flow second opening (55) and into the upper portion (11). The direction of hydraulic fluid flow is controlled by the compression flow path (59). There is no hydraulic flow path to the lower portion (13) during the compression stroke since the rebound valve spool (41) blocks the rebound flow shaped apertures (37). As the piston (7) moves towards its limit of travel during a compression stroke, the pressure differential between the upper and lower portions (11, 13) progressively lessens as the piston slows down, the compression coil spring (47) decompresses and the compression flow shaped apertures (35) close as the compression valve spool (39) returns to its resting position, as illustrated in FIG. 3. At the limit of compression stroke piston movement in the damper, the hydraulic pressure is at least momentarily equal in the upper and lower portions (11, 13) and the compression shaped apertures (35) are again completely blocked.

Figure 6:
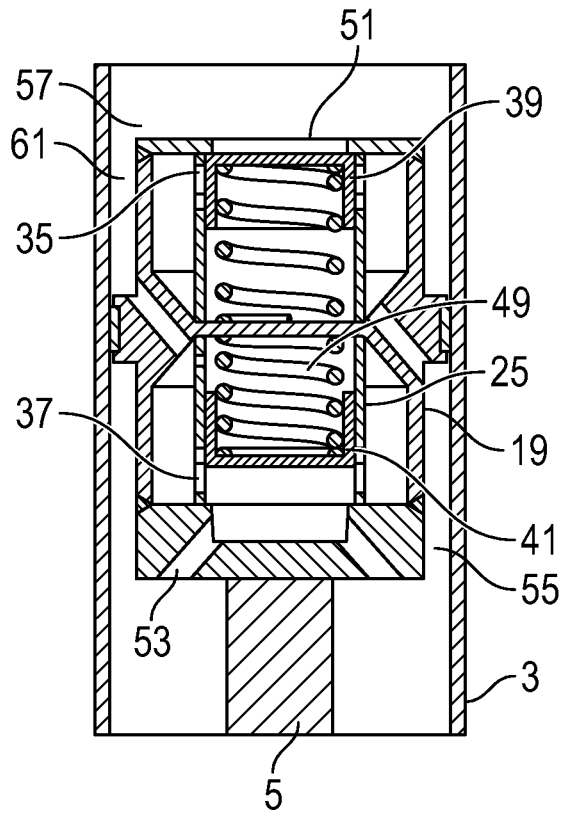
FIG. 6 is a cross-sectional elevation view of a portion of the hydraulic damper assembly during a rebound stroke.
Figure 7:
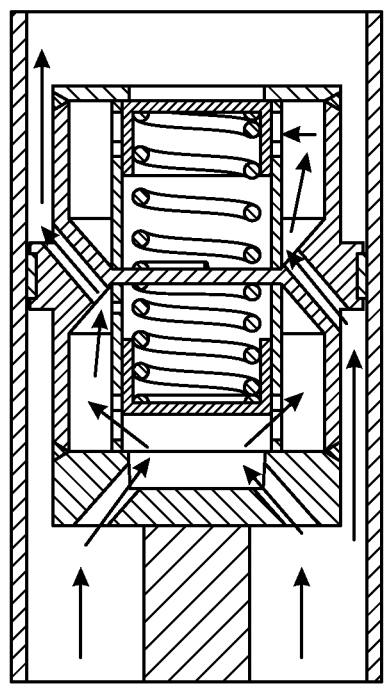
FIG. 7 is the view of FIG. 6 showing flow of hydraulic fluid during a rebound stroke.

By contrast, when a rebound stroke of the piston occurs following compression, as illustrated in FIG. 6 and FIG. 7, the hydraulic fluid seeks to flow from the upper portion (11) to the lower portion (13). Hydraulic fluid thus exerts pressure on the rebound valve spool (41) which compresses the rebound coil spring (49). This causes movement of the rebound valve spool (41) in relation to the rebound valve sleeve (25) which progressively exposes the one or more rebound flow shaped apertures (37) in the rebound valve sleeve (25). Hydraulic fluid then flows from the upper portion (11) though the exposed rebound flow shaped apertures (37) of the rebound valve sleeve (25), through the rebound flow path (61) and into the lower portion (13). In this case, the direction of hydraulic fluid flow during the rebound piston stroke is controlled by the rebound flow path (61). There is no hydraulic flow path to the upper portion (11) during the rebound stroke since the compression valve spool (39) blocks the compression flow shaped apertures (35). As the piston moves back from its limit of travel during the rebound stroke, the pressure differential between the lower and upper portions (13, 11) progressively lessens as the piston slows down, the rebound coil spring (49) decompresses, the rebound flow shaped apertures (37) in the rebound valve sleeve (25) close and the rebound valve spool (41) returns to its resting position, again as shown in FIG. 3. At the limit of rebound stroke piston movement in the damper, the hydraulic pressure is at least momentarily equal in the upper and lower portions (11, 13) and the rebound flow shaped apertures (37) are again completely blocked.

In this way, only one set of shaped apertures is open at any particular time. Both sets of shaped apertures are closed when the damper is under no load. Varying the induced operating pressure of the hydraulic fluid in the hydraulic damper creates proportional longitudinal movement of one of the valve spools against the biasing force of the respective coil spring which in turn changes the area of the limiting hydraulic flow restriction by proportionally exposing larger and smaller areas of the compression and rebound flow shaped apertures, as the case may be at any particular time. The hydraulic damper's operating characteristics are thus defined by the proportional opening and closing of the respective flow shaped apertures in response to induced operating pressure which creates a mathematically predictable and stable pressure vs. flow relationship. This pressure vs. flow relationship of the hydraulic damper can be tuned, when moving in a compression or rebound direction, by altering the profile shape of the respective shaped apertures, by using different spring rates for the respective coil springs, or by changing the preload on respective coil springs.

The array of rebound flow shaped apertures and compression flow shaped apertures may be configured as multiple shaped apertures or as a single shaped aperture in each case. Apertures may be configured with a predetermined profile having a variable width which facilitates desired pressure-flow characteristics. The opening of the shaped apertures offers a mathematically predictable hydraulic flow restriction based on established orifice flow theory at any point during longitudinal movement of the valve spools. The profiles of the array of rebound and compression flow apertures can be identical or independent of each other and are generally complex and irregular in shape.

The use of separate compression and rebound flow paths eliminates the need for one-way valves or check shims and reduces wear on the damper. By eliminating check shims, the risk of check shim failure is also eliminated. The resulting damper is robust and reliable.

Other means to create the same result within the context of this invention will be apparent to those skilled in the art, particularly to facilitate assembly of the damper. For example, the valve body may be made in multiple pieces so that the internal components may be assembled before the valve body pieces are connected.

It should be understood that although particular component arrangements are disclosed in the illustrated embodiments, other arrangements will benefit from this invention. Although particular step sequences are shown and described, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although example embodiments have been disclosed, a worker of ordinary skill in this art would recognize that certain modifications would come within the scope of the claims. For that reason, the following claims should be studied to determine their true scope and content.

The invention claimed is:

1. A hydraulic damper spool valve comprising:
    a valve body adapted to be affixed to a main piston rod of a hydraulic damper;
    the valve body configured with openings adjacent its opposing ends, one of which openings is in fluid communication with an upper portion of the hydraulic damper and the other one of which openings is in fluid communication with a lower portion of the hydraulic damper to facilitate flow of a hydraulic fluid between the upper portion and the lower portion under operating pressures;
    a pair of hollow cylindrical valve sleeves together defining a bore interrupted by a dividing section or valve body membrane and being fixed in relation to the valve body;
    the hollow cylindrical valve sleeves each configured with at least one shaped aperture adjacent an opposing end of the respective valve sleeve selectively adapted to hydraulically connect the upper portion and the lower portion of the hydraulic damper;

a pair of valve spools each operatively configured to be moveably disposed within the bore of the respective valve sleeve and adapted to selectively block at any one time, all the shaped apertures, or only the at least one shaped aperture adjacent the opposing end of one valve sleeve, or only the at least one shaped aperture adjacent the opposing end of the other valve sleeve;

a pair of resilient energy storage members one of which is disposed between each valve spool and the valve body dividing section or membrane so as to bias the valve spools in opposing directions to the forces generated by the operating pressures in the hydraulic fluid of the hydraulic damper;

such that when a respective energy storage member is compressed as operating pressure is induced at either of the valve body openings, either one or the other of the valve spools moves relative to the respective valve sleeve so that an open area of the at least one shaped aperture adjacent the moving valve spool varies in proportional relationship to the pressure, thereby varying the hydraulic flow restriction between upper portion and the lower portion of the hydraulic damper, while the non-moving valve spool blocks the at least one shaped aperture adjacent the non-moving valve spool; and a compression hydraulic flow path structurally separate from a rebound hydraulic flow path to prevent backflow via the other hydraulic flow path during hydraulic flow in either direction, each said flow path communicating with only the at least one shaped aperture adjacent the opposing end of one of the valve sleeves.

2. The hydraulic damper spool valve of claim 1, wherein the hollow cylindrical valve sleeves comprise a compression valve sleeve configured with an array of compression flow shaped apertures and a rebound valve sleeve configured with an array of rebound flow shaped apertures, the energy storage members comprise a compression energy storage member and a rebound energy storage member, and the pair of valve spools comprises a compression valve spool configured to selectively open and close the corresponding compression flow shaped apertures and a rebound valve spool configured to selectively open and close the corresponding rebound flow shaped apertures.

3. The hydraulic damper spool valve of claim 2, wherein the arrays of rebound flow shaped apertures and the array of compression flow shaped apertures are configured with predetermined precise shapes and each of the rebound and compression valve spools is configured with a leading edge that is adapted to accurately control the variable open area of the respective rebound and compression flow shaped apertures in a proportional relationship to the operating pressure in the damper so as to provide desired pressure-flow characteristics.

4. The hydraulic damper spool valve of claim 1, wherein the resilient energy storage members are coil springs.

5. The hydraulic damper spool valve of claim 1, wherein the bore comprises two internal bores separated by the dividing section or valve body membrane, and wherein the two internal bores of the hollow cylindrical valve sleeves are adapted to receive the valve spools with a predetermined close tolerance radial clearance that is configured to selectively allow longitudinal movement of each of the valve spools within the respective internal bore while preventing hydraulic flow through the radial clearance.

6. The hydraulic damper spool valve of claim 1, wherein the hydraulic spool valve is affixed to the main piston rod through mechanical fastening, welding, threading or the like.

7. The hydraulic damper spool valve of claim 1, wherein a leading edge of each valve spool exposed to hydraulic fluid flow via the at least one corresponding shaped aperture is chamfered to present a sharp edge to provide minimal perturbation of hydraulic fluid flow across the valve spool.

8. The hydraulic damper spool valve of claim 1, wherein the valve sleeves comprise a compression valve sleeve and a rebound valve sleeve separated by a dividing section of the valve body, and the resilient energy storage members comprise a compression energy storage member and a rebound energy storage member which respectively bias one of the pair of valve spools away from the dividing section of the valve body.

9. A hydraulic damper assembly comprising:

a main body, a piston rod and a main piston comprising a valve body affixed to the piston rod operatively configured to define an upper portion and a lower portion within the main body;

the valve body configured with openings at its opposing ends, one of which is selectively in fluid communication with the upper portion of the main body and the other of which is selectively in fluid communication with the lower portion of the main body;

a pair of hollow cylindrical valve sleeves together defining a bore interrupted a valve body divider or membrane and being fixed in relation to the valve body;

the hollow cylindrical valve sleeves each configured with at least one shaped aperture adjacent an opposing end of the respective valve sleeve selectively adapted to hydraulically connect the upper portion and the lower portion of the hydraulic damper;

a pair of valve spools each operatively configured to be moveably disposed within the bore of the respective valve sleeve and adapted to selectively block at any one time, all shaped apertures, or only the at least one shaped aperture adjacent the opposing end of one valve sleeve, or only the at least one shaped aperture adjacent the opposing end of the other valve sleeve;

a pair of resilient energy storage members one of which is disposed between each valve spool and the valve body divider or membrane so as to bias the respective valve spools in opposing directions to the forces generated by the operating pressures in the hydraulic fluid of the hydraulic damper; and a compression hydraulic flow path structurally separate from a rebound hydraulic flow path to prevent back flow during hydraulic flow in either direction via the other hydraulic flow path, each said flow path communicating with only one of the at least one shaped aperture adjacent the opposing end of one of the valve sleeves;

such that when a respective energy storage member is compressed as operating pressure is induced at either of the valve body openings, either one or the other of the valve spools moves relative to the respective valve sleeve so that an open area of the respective at least one shaped aperture adjacent the moving valve spool varies in proportional relationship to the pressure, thereby varying the hydraulic flow restriction between the upper portion and the lower portion of the hydraulic damper while the non-moving valve spool blocks the at least one shaped aperture adjacent the non-moving valve spool.

10. The hydraulic damper assembly of claim 9, wherein the valve sleeves comprise a compression valve sleeve and a rebound valve sleeve separated by a dividing section of the valve body, and the resilient energy storage members comprise a compression energy storage member and a rebound energy storage member which respectively bias one of the pair of valve spools away from the dividing section of the valve body.

\* \* \* \* \*